(12) United States Patent
Soderlind et al.

(10) Patent No.: US 11,673,601 B2
(45) Date of Patent: Jun. 13, 2023

(54) HANDWHEEL ACTUATOR MODULAR INTERFACE

(71) Applicant: Ford Global Technologies, LLC, Dearborn, MI (US)

(72) Inventors: Erik William Soderlind, Harrison Township, MI (US); Steve Bryan Amburgy, Commerce Township, MI (US); Taras Palczynski, Ann Arbor, MI (US)

(73) Assignee: FORD GLOBAL TECHNOLOGIES LLC, Dearborn, MI (US)

( * ) Notice: Subject to any disclaimer, the term of this patent is extended or adjusted under 35 U.S.C. 154(b) by 151 days.

(21) Appl. No.: 17/194,709

(22) Filed: Mar. 8, 2021

(65) Prior Publication Data

US 2022/0281512 A1 Sep. 8, 2022

(51) Int. Cl.
B62D 5/00 (2006.01)

(52) U.S. Cl.
CPC .................... B62D 5/006 (2013.01)

(58) Field of Classification Search
CPC ...................................... B62D 5/006
See application file for complete search history.

(56) References Cited

U.S. PATENT DOCUMENTS

| | | | | |
|---|---|---|---|---|
| 2003/0209381 A1* | 11/2003 | Menjak | .................. | B60R 21/205 180/402 |
| 2015/0298724 A1* | 10/2015 | Ishii | ..................... | B62D 5/0403 180/443 |
| 2016/0194024 A1* | 7/2016 | Kikuchi | .................... | F16H 1/16 180/444 |
| 2017/0210411 A1* | 7/2017 | Kogure | ................ | B62D 5/0403 |
| 2017/0361867 A1* | 12/2017 | Lewis | .................... | B62D 5/006 |
| 2019/0016365 A1* | 1/2019 | Swamidason | .......... | B62D 5/006 |
| 2019/0217885 A1* | 7/2019 | Figura | .................... | H02K 5/161 |
| 2020/0300298 A1* | 9/2020 | Dimartino | ............. | F16C 33/303 |

FOREIGN PATENT DOCUMENTS

CN 110671500 A * 1/2020

* cited by examiner

*Primary Examiner* — Minnah L Seoh
*Assistant Examiner* — Ryan Edward Hardy
(74) *Attorney, Agent, or Firm* — Burr & Forman LLP; Lorne Forsythe

(57) ABSTRACT

A handwheel actuator for a steer by wire system may include a feedback actuator and a column for operably coupling a handwheel to the handwheel actuator. The column includes a column shaft extending from a first end of the column to a second end of the column. The feedback actuator is operably coupled to the second end of the column and provides tactile feedback to an operator responsive to movement of the handwheel. The feedback actuator includes a torsion bar coaxial with the column shaft. The column shaft is supported relative to a housing of the column by a first column shaft bearing disposed proximate to the first end of the column and a second column shaft bearing disposed proximate to the second end of the column. The torsion bar is operably coupled to a sleeve element that is operably coupled to the column shaft proximate to the second column shaft bearing to facilitate torque transfer between the column shaft and the torsion bar.

19 Claims, 15 Drawing Sheets

US 11,673,601 B2

1

HANDWHEEL ACTUATOR MODULAR INTERFACE

TECHNICAL FIELD

Example embodiments generally relate to vehicle control technology and, more particularly, relate to an interface between modules (or components) of a handwheel actuator in a steer by wire system.

BACKGROUND

Vehicles are consistently moving toward the integration of electrical or electro-mechanical components that perform various vehicle functions that were previously performed using mechanical linkages. Drive by wire, steer by wire and brake by wire are some examples of this migration away from mechanical linkages. A result of this migration is that vehicles may become lighter, and easier to service and maintain.

However, in spite of the advantages noted above, the design and integration of new components for these systems may sometimes be challenging for manufacturers. Accordingly, it may be desirable to define certain standard interfaces between components so that such components can be reliably integrated into different vehicle models and types regardless of who the individual manufacturers were for specific components.

BRIEF SUMMARY OF SOME EXAMPLES

In accordance with an example embodiment, a handwheel actuator for a steer by wire system may be provided. The handwheel actuator may include a feedback actuator and a column for operably coupling a handwheel to the handwheel actuator. The column may include a column shaft extending from a first end of the column to a second end of the column. The feedback actuator may be operably coupled to the second end of the column and provides tactile feedback to an operator responsive to movement of the handwheel. The feedback actuator may include a torsion bar coaxial with the column shaft. The column shaft may be supported relative to a housing of the column by a first column shaft bearing disposed proximate to the first end of the column and a second column shaft bearing disposed proximate to the second end of the column. The torsion bar may be operably coupled to a sleeve element that is operably coupled to the column shaft proximate to the second column shaft bearing to facilitate torque transfer between the column shaft and the torsion bar.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3, which is defined by FIGS. 3A, 3B, 3C, 3D and 3E, shows various components and structures that may define a column-actuator interface that includes an adapter in accordance with an example embodiment;

2

Figure 5A:
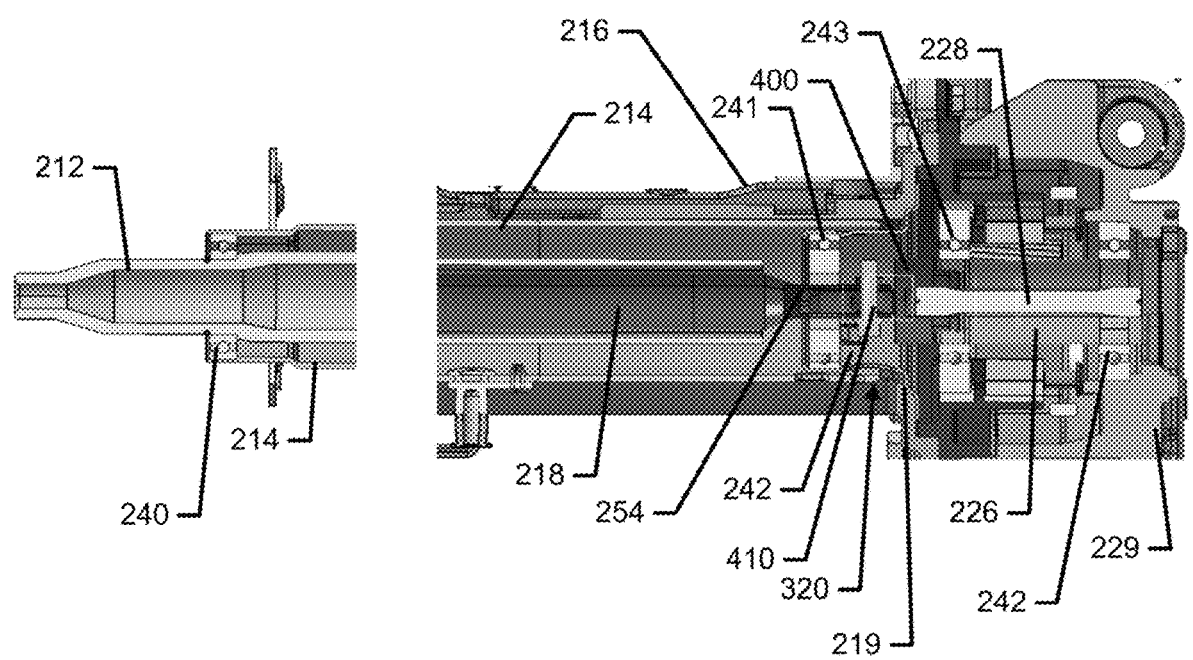
Figure 5B:
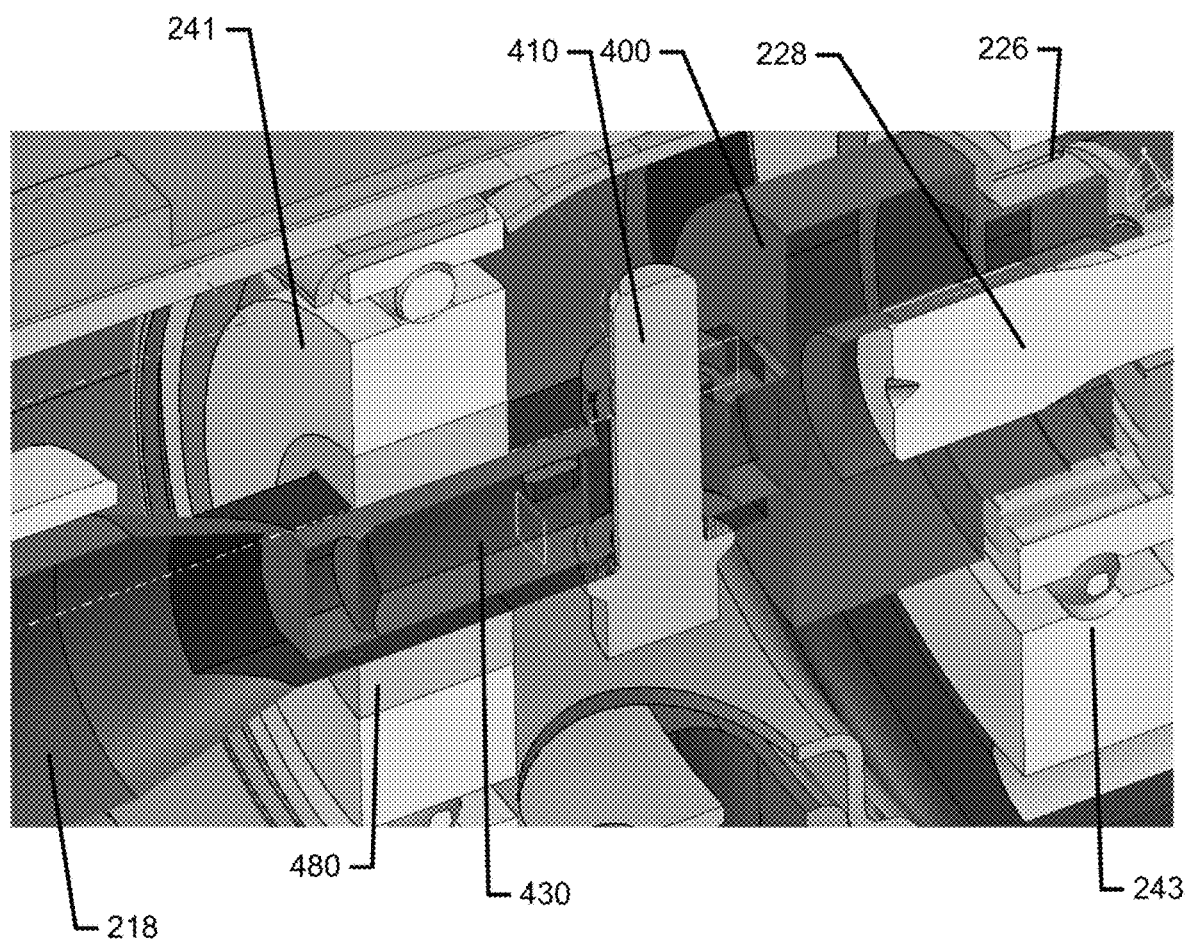
Figure 5C:
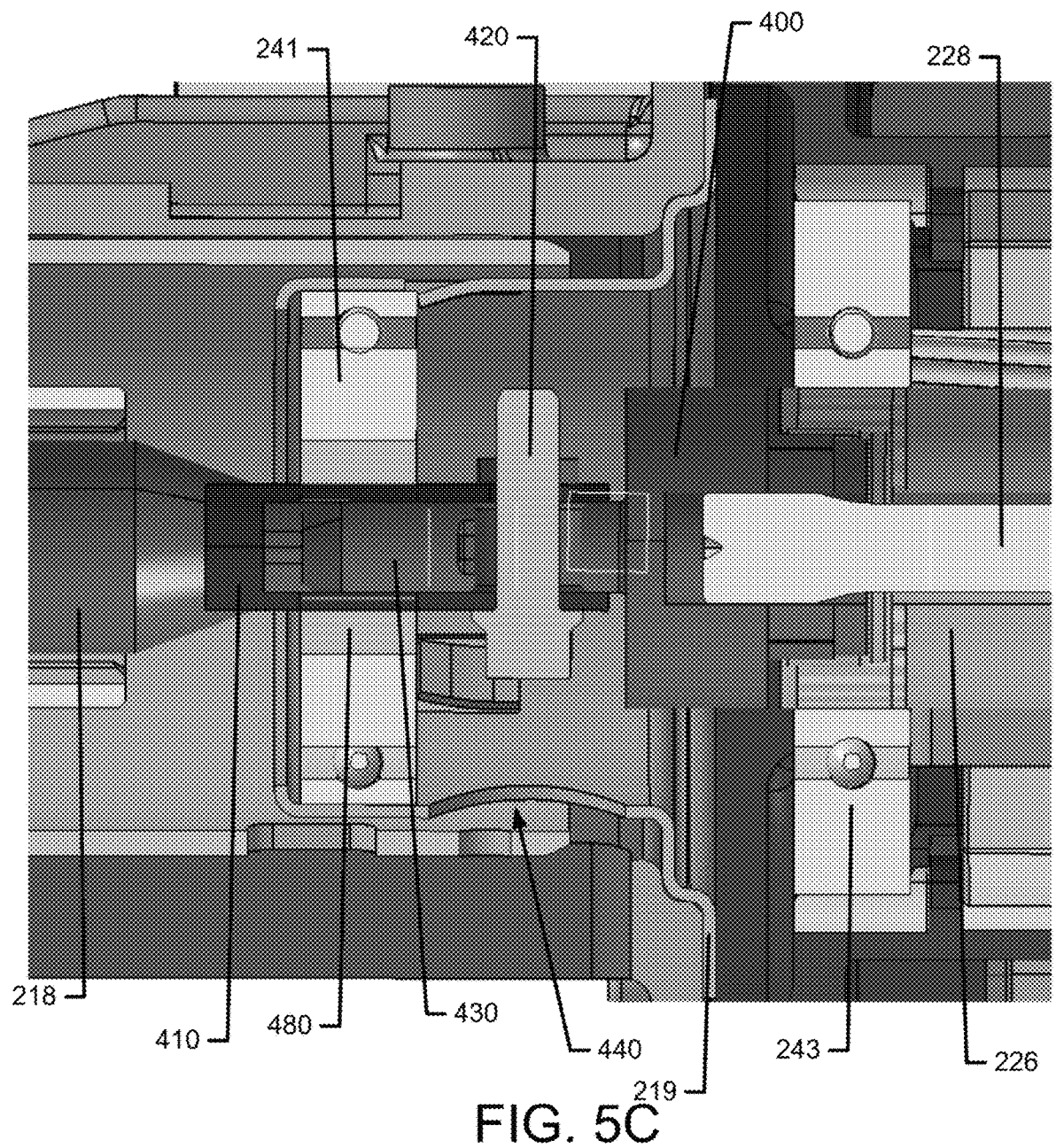
Figure 5D:
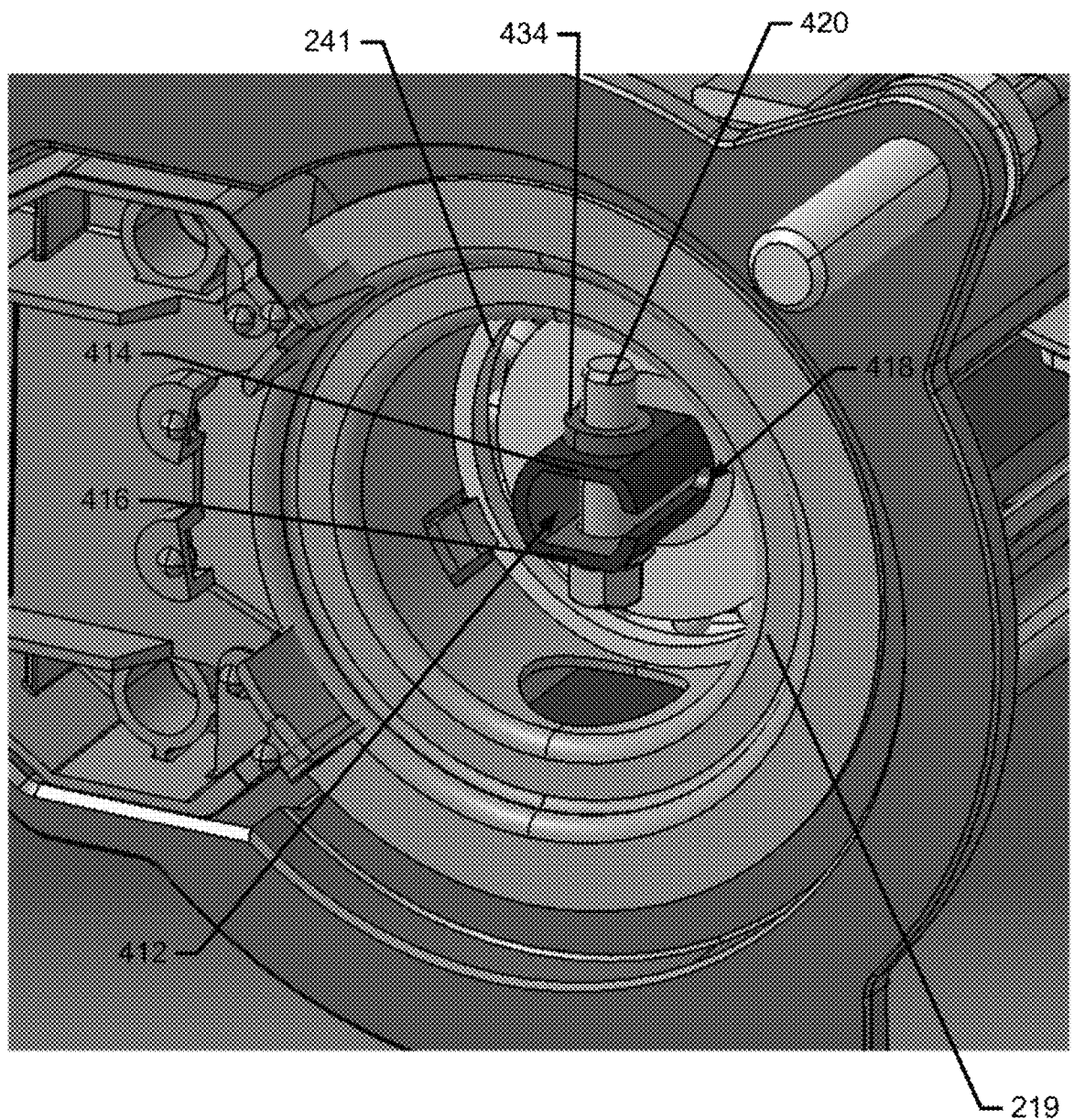
Figure 5E:
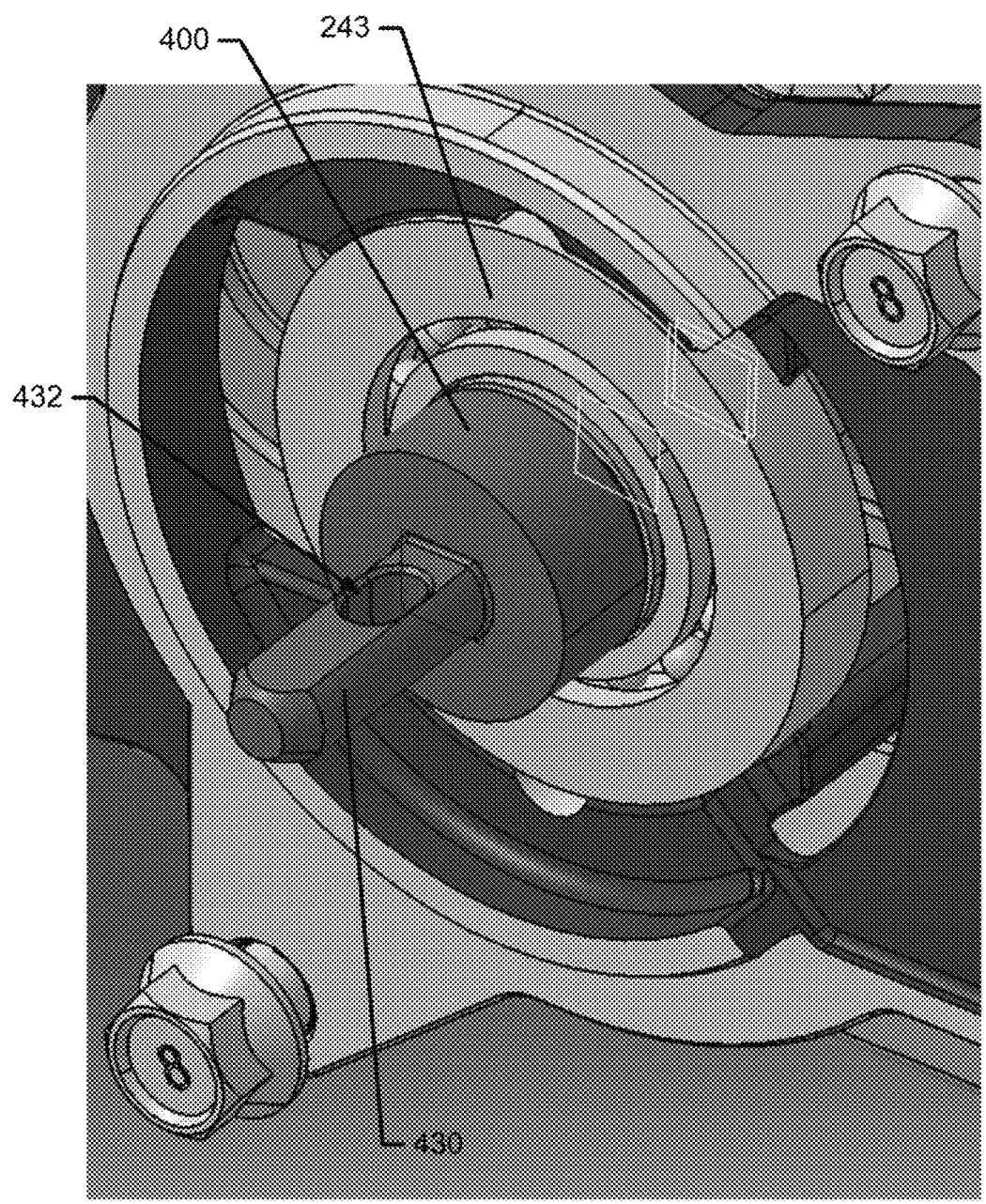
Figure 6A:
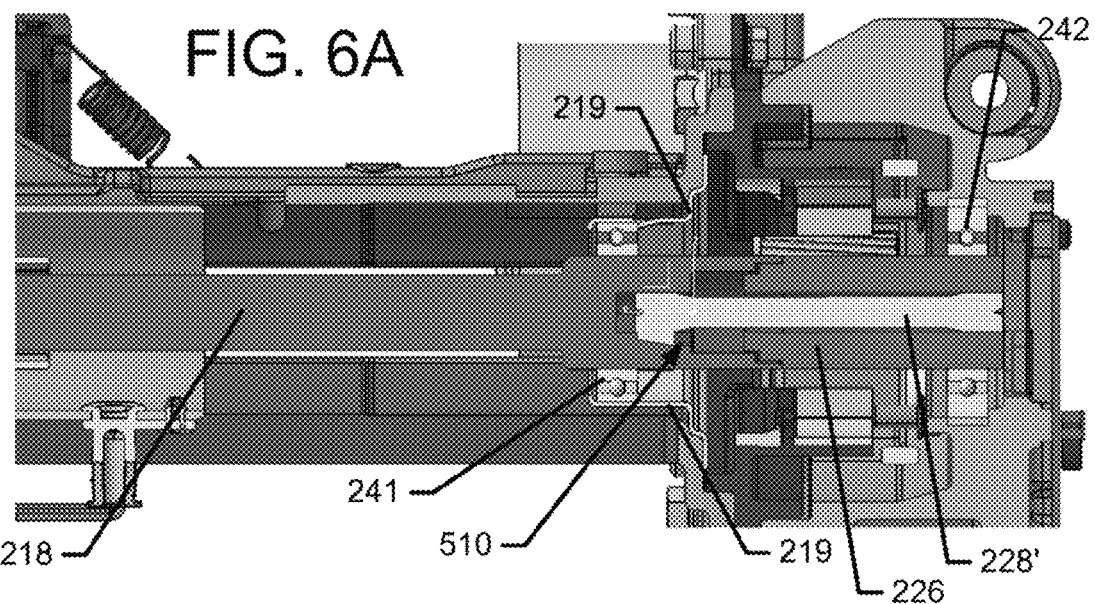
Figure 6B:
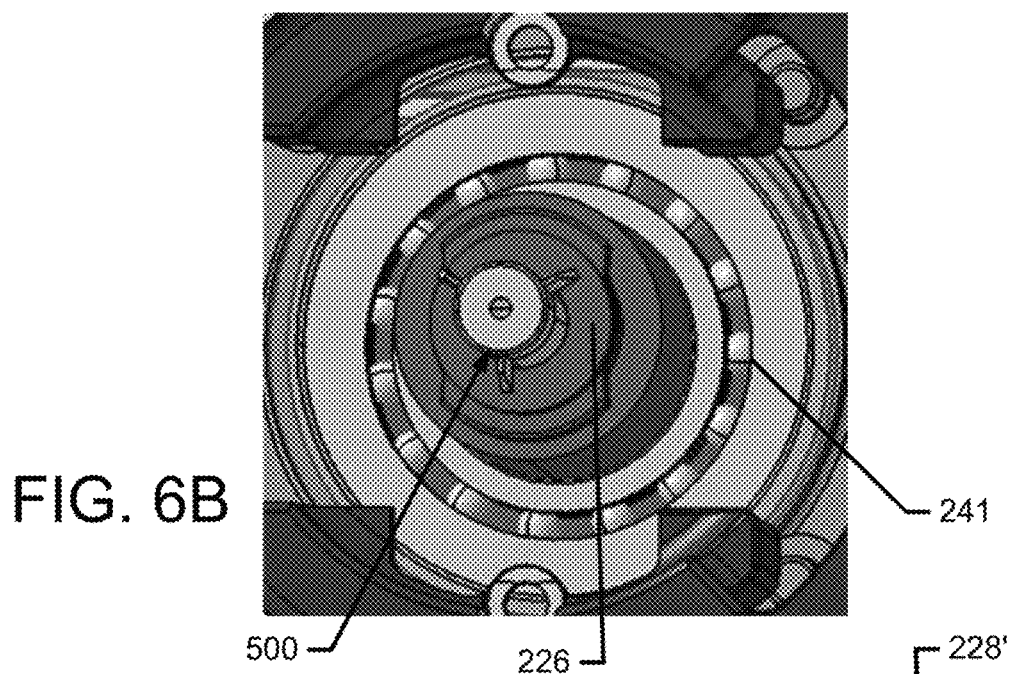
Figure 6C:
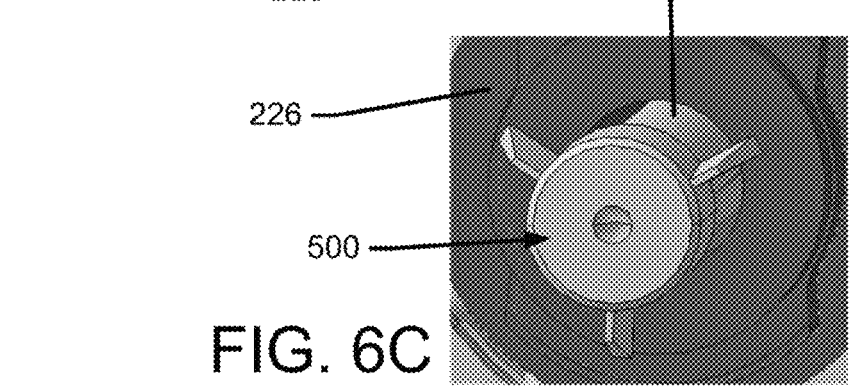

FIG. 4, which is defined by FIGS. 4A, 4B, 4C and 4D, shows an alternative column-actuator interface structure in accordance with an example embodiment;

FIG. 5, which is defined by FIGS. 5A, 5B, 5C, 5D and 5E shows a column-actuator interface that does not employ a compressible material as an adapter in accordance with an example embodiment; and FIG. 6, which is defined by FIGS. 6A, 6B and 6C show another alternative column-actuator interface structure in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 1:
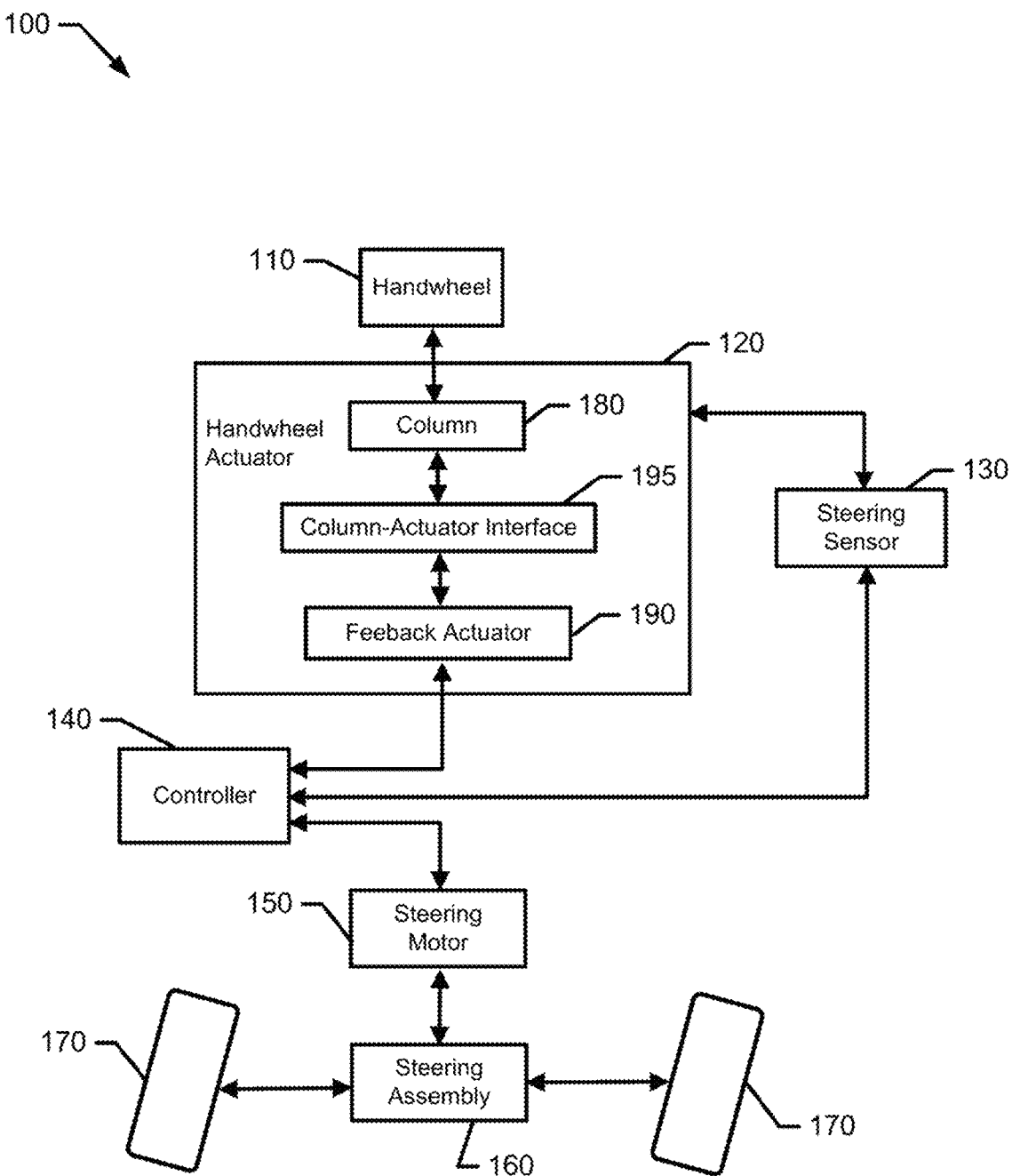
FIG. 1 illustrates a block diagram of a steer by wire system of a vehicle in accordance with an example embodiment.

As noted above, it may be desirable to define certain component interfaces to consistently meet certain standards or specifications to ensure compatibility regardless of manufacturer. One such interface may be associated with steer by wire systems, and may relate to the feedback actuator of such a system. FIG. 1 illustrates a block diagram of some components of a steer by wire system 100 in accordance with an example embodiment. Of note, although the components of FIG. 1 may be part of or operably coupled to the vehicle, it should be appreciated that such connection(s) may be either direct or indirect. Moreover, some of the components of the steer by wire system 100 may be connected to the vehicle via intermediate connections to other components either of the chassis or of other electronic and/or mechanical systems or components.

Referring now to FIG. 1, the steer by wire system 100 may include a handwheel 110, which is located with a vehicle for manual manipulation by a driver or operator of the vehicle. The handwheel 110 is typically a traditional steering wheel, and therefore may be round and rotatable about an axis. However, other structures could be substituted for implementation as the handwheel 110 in alternative embodiments. The movements (typically rotations) of the handwheel 110 are communicated to a handwheel actuator 120 that is operably coupled to the handwheel 110. The handwheel 110 and/or the handwheel actuator 120 may also be operably coupled to one or more steering sensors 130 that may be configured to determine steering angle and/or torque input at the handwheel 110. In some cases, the steering sensor 130 (or sensors) may be part of the handwheel actuator 120. However, the steering sensor 130 could alternatively be a separate component.

In an example embodiment, the handwheel actuator 120 and/or the steering sensor 130 may be operably coupled to a controller 140. In some cases, the controller 140 may be part of an electronic control system of the vehicle. The controller 140 may therefore also be configured to perform other tasks related or not related to steer by wire control or performance management. However, the controller 140 could be a dedicated or standalone controller in some cases. Processing circuitry (e.g., a processor and memory) at the controller 140 may process the information received by, for example, running one or more control algorithms based on the information received. The control algorithms may include instructions that can be stored by the memory for retrieval and execution by the processor. In some cases, the memory may further store one or more tables (e.g., look up tables) and various calculations and/or applications may be executed using information in the tables and/or the information to generate outputs to a steering motor 150 based on the inputs received (e.g., from the handwheel actuator 120 and/or steering sensor 130).

In an example embodiment, the steering motor 150 (or steering actuator) may be an electrical motor that is operably coupled to a steering assembly 160 to drive the steering assembly 160 to turn wheels 170 (typically front wheels) of the vehicle. The steering assembly 160 may include one or more of a chain, belt, steering gear(s), rack and pinion, direct drive, or other structures that communicate steering torque to the wheels 170.

In an example embodiment, the handwheel actuator 120 may include subcomponents that may be made by different manufacturers, suppliers or sourcing agents, which are often simply referred to as original equipment manufacturers (OEMs). In this regard, for example, the handwheel actuator 120 may include a column 180 and a feedback actuator 190. The column 180 may include structural interfaces to the handwheel 110 to enable the rotational inputs at the handwheel 110 to be communicated to the controller 140 for generation of inputs to the steering motor 150. The feedback actuator 190 may include an electric motor and other components that are designed to provide feedback that gives operators a tactile response similar to that of conventional mechanical or hydraulic steering systems.

As noted above, the use of the handwheel actuator 120 creates significant flexibility in terms of enabling designers to easily change steering ratios and torque resistances or otherwise modify steering functionality. In this regard, for example, relatively simple software commands may enable such alteration instead of any physical component replacement or manipulation. Additionally, by not mechanically linking the handwheel 110 to the wheels 170, greater flexibility is unlocked in terms of other aspects of vehicle design, including stowable handwheels and/or steering columns for self-driving options coming in the future.

Although it may be possible for the entire handwheel actuator 120 to be manufactured by a single OEM, the nature of competition in the global automotive sector, and the fact that different areas of specialization may be required to manufacture the column 180 than those required for manufacture of the feedback actuator 190, may dictate that different OEMs could be used for each part. Moreover, the fact that it may be desirable to have the column 180 and the feedback actuator 190 be separate serviceable and individually replaceable components so that failure or service life exhaustion of one does not necessitate replacement of the other tends to motivate the modularization of the column 180 and the feedback actuator 190 as separate modules or components with an interface (e.g., a column-actuator interface 195) therebetween. If the same OEM produced both the column 180 and the feedback actuator 190, the OEM would own the interfaces (including the column-actuator interface 195) therebetween. The OEM could theoretically define the interface anyway they wanted. However, if different OEMs were involved, or the potential for different OEMs existed, then the column-actuator interface 195 may become a potentially limiting component, and the incentive becomes strong to standardize or limit variation of certain aspects of the column-actuator interface 195.

In order to provide a robust connection between the feedback actuator 190 and the column 180, while still allowing for the potential of separate sourcing and servicing of the components, example embodiments may provide structures for defining the column-actuator interface 195. Notably, components that form the column-actuator interface 195 may be part of the feedback actuator 190 or the column 180, and need not be separate components or modules themselves. Thus, for example, in some cases, the column-actuator interface 195 may be defined as components of the column 180 and/or the feedback actuator 190 that interface with each other to operably couple the column 180 to the feedback actuator 190. However, some components of the column-actuator interface 195 may be considered to be part of a separate module from each or either of the column 180 and the feedback actuator 190.

Figure 2:
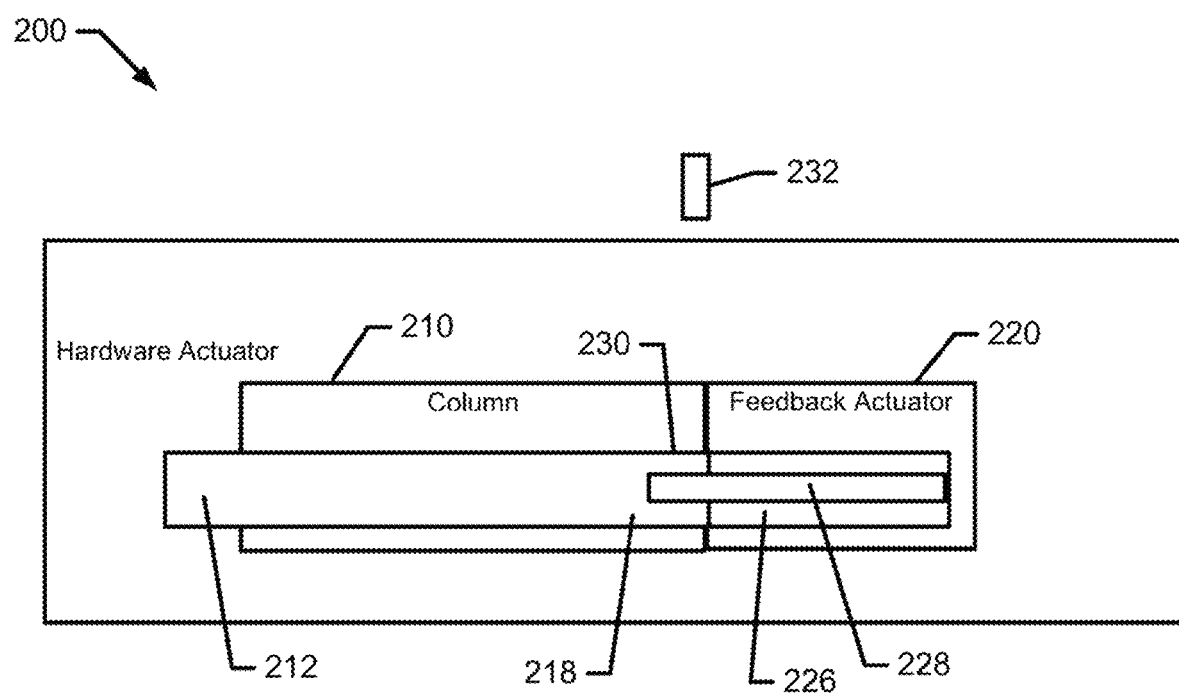
FIG. 2 illustrates a schematic view of a handwheel actuator in accordance with an example embodiment.

FIGS. 2-6 demonstrate some specific structures that may be used to implement various aspects of the steer by wire system 100 of FIG. 1. FIG. 2 illustrates a schematic view of a handwheel actuator 200, which may be an example of the handwheel actuator 120 of FIG. 1. In FIG. 2, a column portion (or column 210) and feedback actuator portion (or feedback actuator 220) may be understood to be separable modules or component that may be joined at an interface therebetween (which form an example of the column-actuator interface 195 of FIG. 1). The column 210 is an example of the column 180, and the feedback actuator 220 is an example of the feedback actuator 190 of FIG. 1.

Figure 3A:
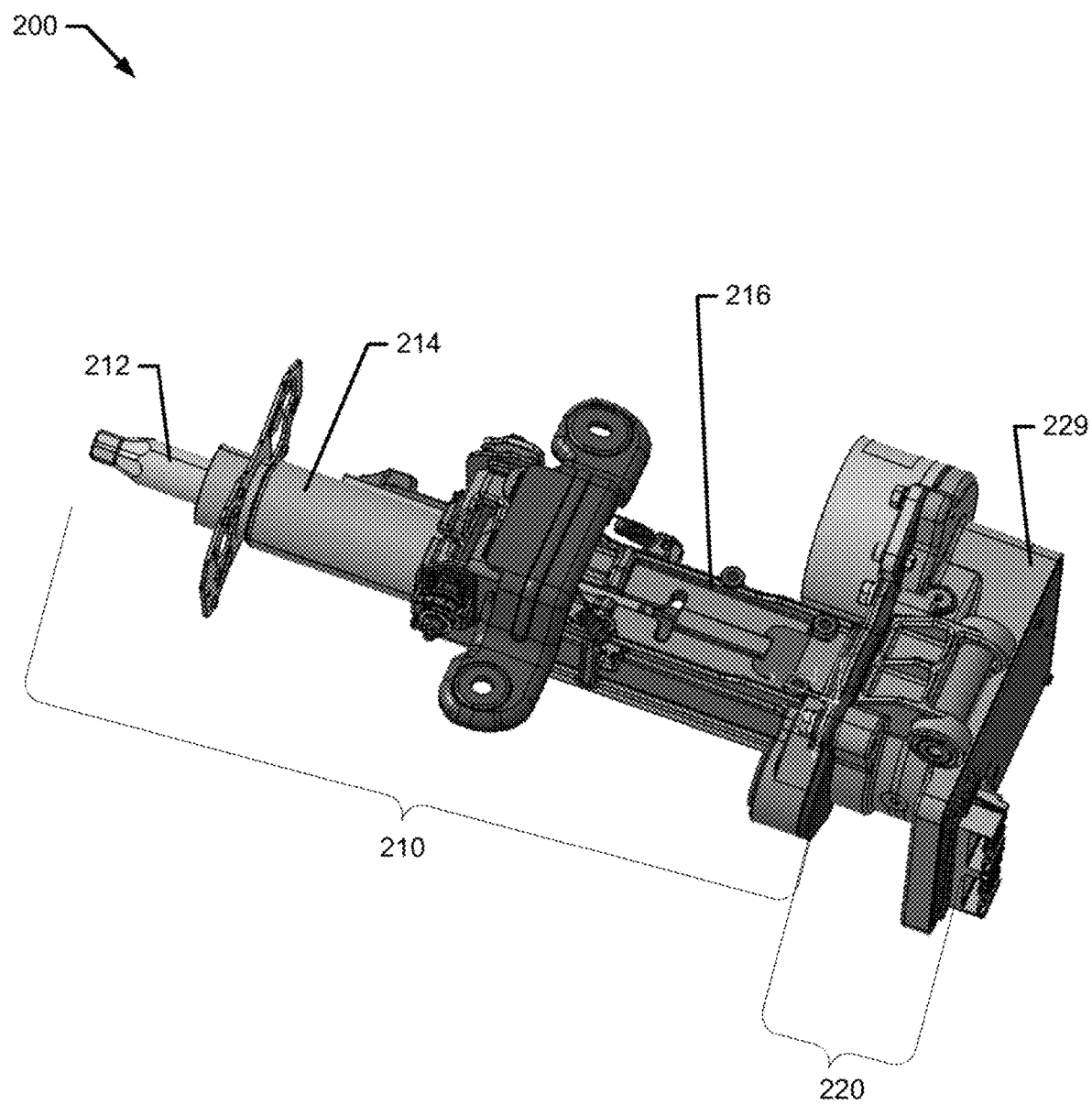
Figure 3B:
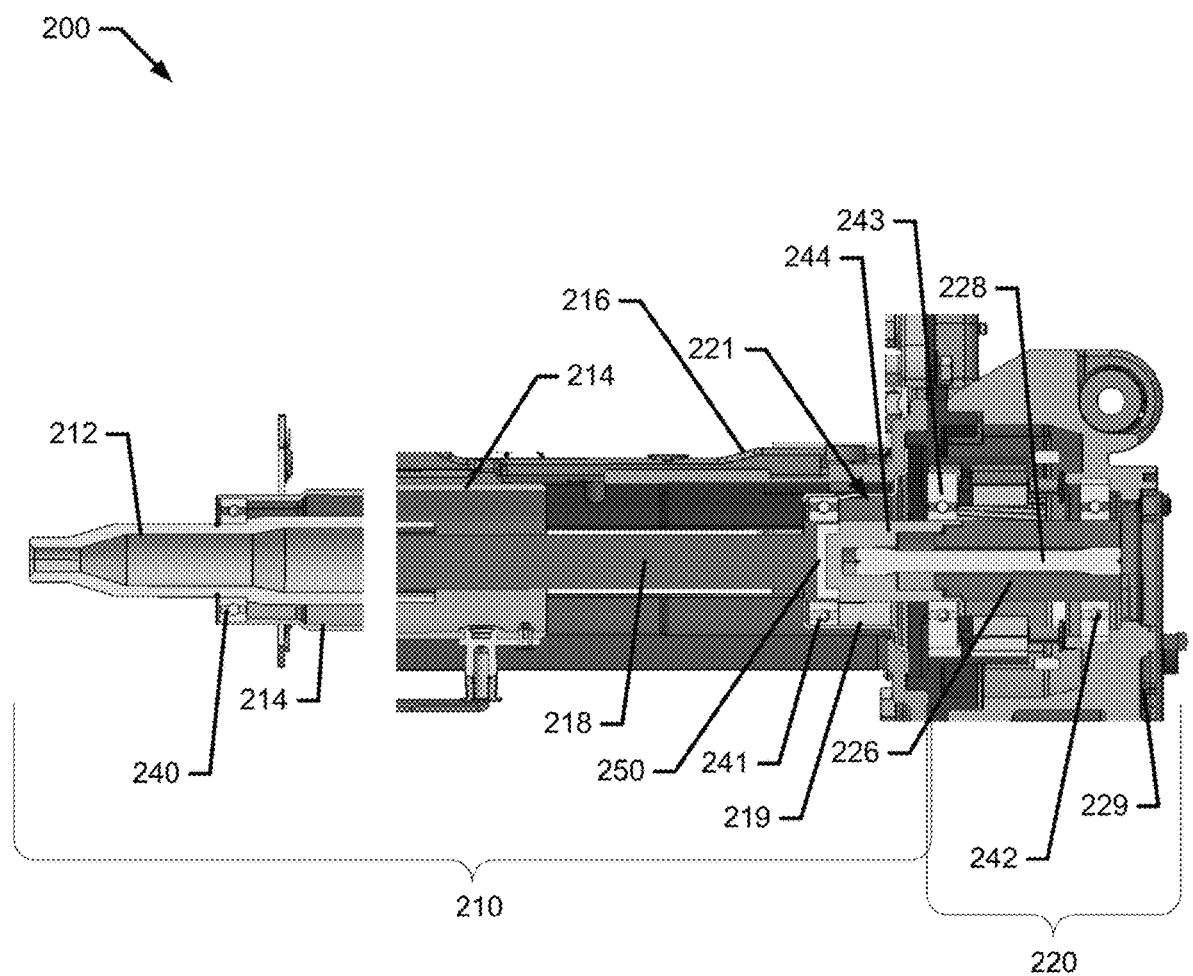
Figure 3C:
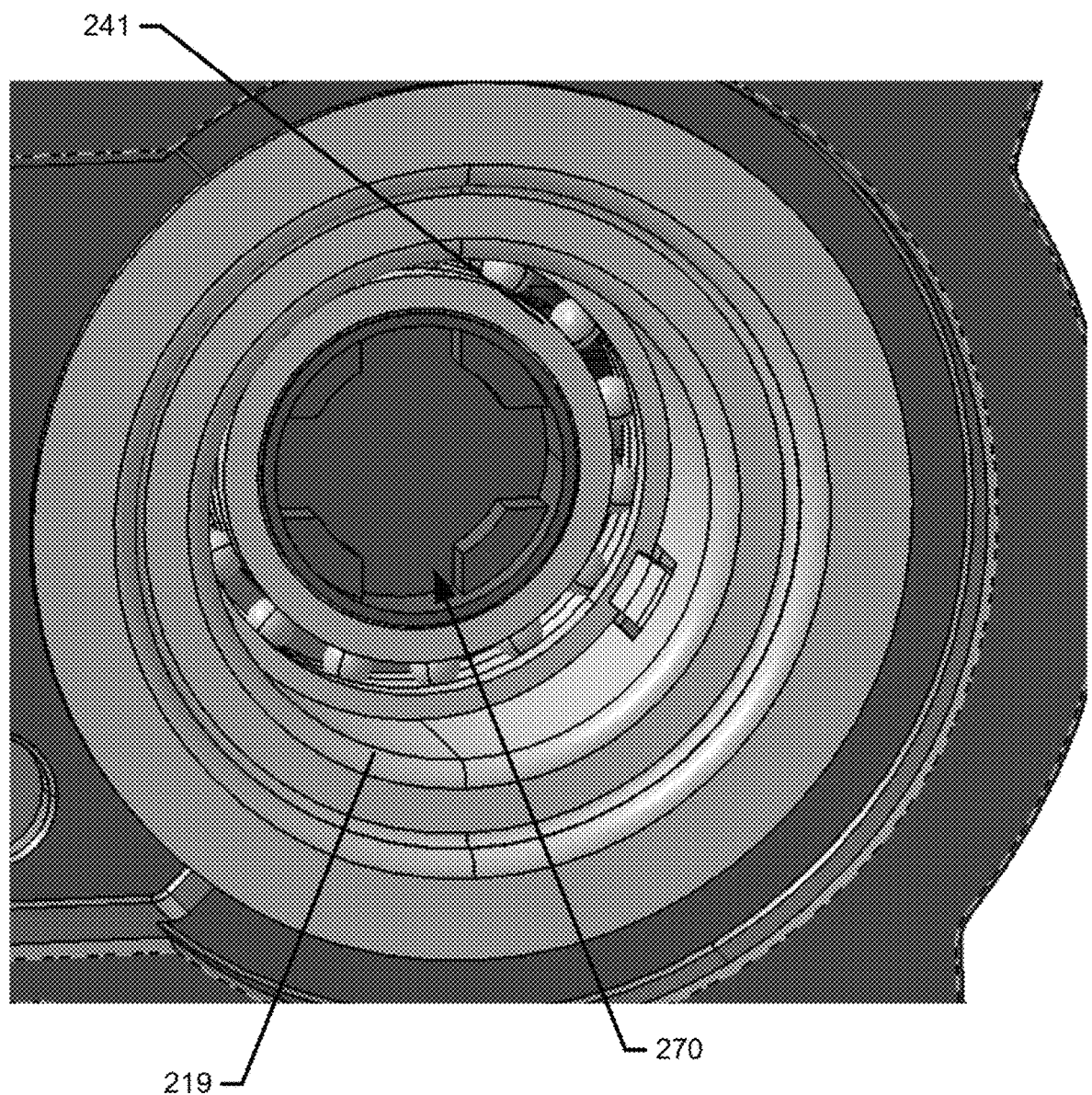
Figure 3D:
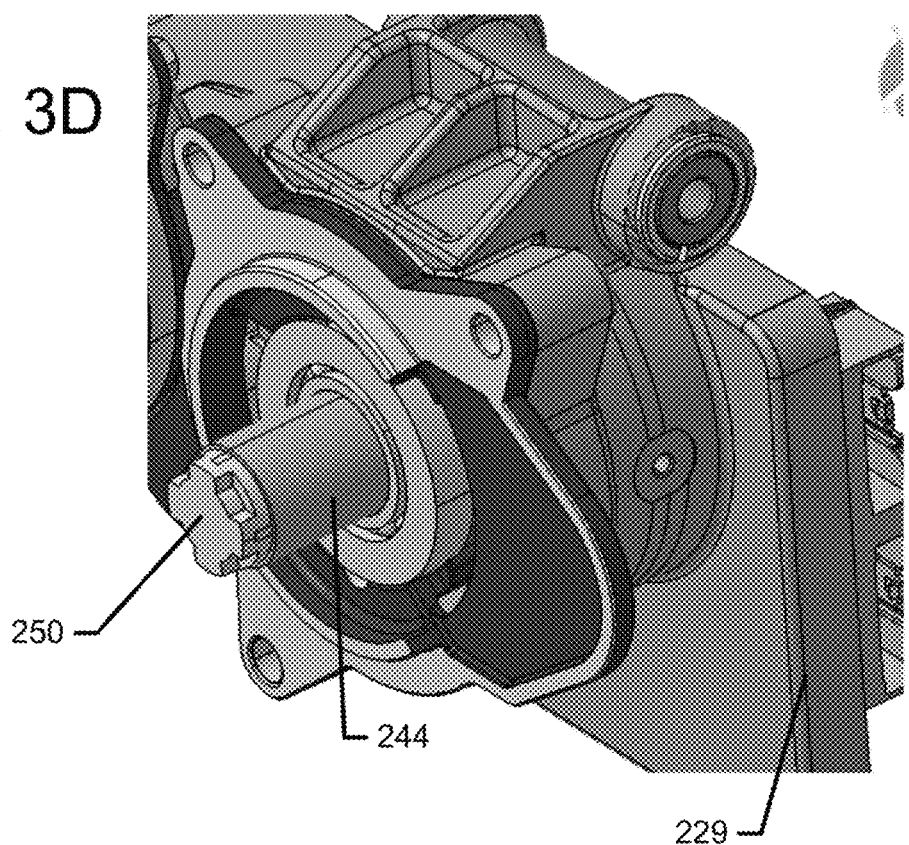
Figure 3E:
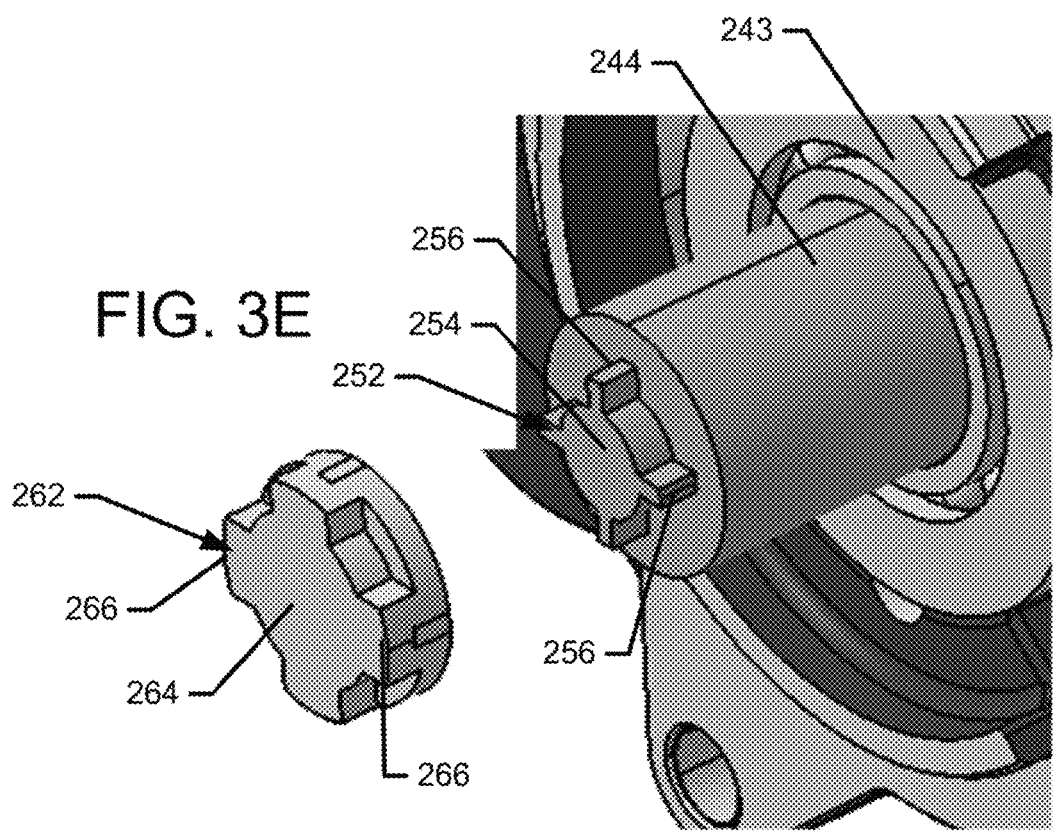

FIG. 3, which is defined by FIGS. 3A, 3B, 3C, 3D and 3E, shows various components and structures that may define an interface between the column 210 and the feedback actuator 220 and therefore form portions of the column-actuator interface 195 of FIG. 1. In this regard, FIG. 3A is a perspective view of the handwheel actuator 200, and FIG. 3B illustrates a cross section view through a longitudinal center of the handwheel actuator 200 of FIG. 3A. FIG. 3C is a perspective view of a proximal end of the column 210 separated from the feedback actuator 220. Meanwhile, FIGS. 3D and 3E illustrate perspective views of the portion of the feedback actuator 220 that interfaces with the proximal end of the column 210. In this regard, FIG. 3D is a partially exploded view, and FIG. 3E shows components assembled.

Referring to FIGS. 2 and 3, the column 210 may include an upper steering shaft 212 that may be supported or held in place by an upper steering jacket 214. The upper steering jacket 214 may be operably coupled to a lower column casting 216. The upper steering jacket 214 and the lower column casting 216 may combine to form a housing of the column 210. The upper steering shaft 212 may be operably coupled to a handwheel (e.g., handwheel 110) at one end (i.e., a proximal end), and may be operably coupled to (or integrally formed with) a lower steering shaft 218 at the opposing end (i.e., a distal end thereof relative to the handwheel 110). The upper steering shaft 212 and the lower steering shaft 218 may combine to form a steering shaft or column shaft of the column 210.

In an example embodiment, the upper steering jacket 214 may be operably coupled to the lower column casting 216 to enclose the lower steering shaft 218 entirely therein. In some cases, the lower column casting 216 and the upper steering shaft 212 may be operably coupled in such a way that permits (e.g., responsive to impact) the upper steering jacket 214 to slide deeper into the lower column casting 216 (e.g., telescopically retracting) to absorb impact. As such, a degree to which the upper steering jacket 214 can move within the lower column casting 216 may define how much movement of the handwheel 110 may be possible in an impact scenario.

Although not required (and actually not included in the example embodiment of FIG. 3), FIG. 2 shows that the lower column casting 216 may include, in some cases, an access port 230 formed therein. When included, the access port 230 may be an aperture or opening in a lateral side of the lower column casting 216 at a portion of the lower column casting 216 that is proximate to (although in some cases spaced apart slightly from) the feedback actuator 220. The access port 230 may allow visibility and physical access into the lower column casting 216, and more specifically grant access to a front end of the lower steering shaft 218, which may be a distal end of the lower steering shaft 218 relative to the upper steering shaft 212. A cover 232 may be provided to fit within or close the access port 230 to prevent access to the inside of the lower column casting 216. Removal of the cover 232 may therefore provide the access described above.

The feedback actuator 220 may include a motor that is operably coupled to a driven shaft (e.g., stub shaft 226) that is generally coaxial with the column shaft. The operable coupling between the motor and the stub shaft 226 may be accomplished in many ways depending on the orientation and nature of the motor. For example, the motor could have a motor shaft that extends in the forward direction (i.e., relative to the front of the vehicle), which may be parallel to and offset from an axis of the upper steering shaft 212 and the lower steering shaft 218. However, the motor shaft could alternatively be perpendicular to the column shaft or inline therewith in other alternative arrangements. As such, it may be appreciated that the motor shaft could be directly or indirectly coupled to the stub shaft 226 (e.g., via a belt, gear assembly, worm gear, etc.) in a number of different ways. The stub shaft 226 may be coaxial with a torsion bar 228 that is operably coupled to the stub shaft 226 to rotate with the stub shaft 226. The motor and the stub shaft 226 may provide the feedback described above, which is fed through the lower steering shaft 218 and the upper steering shaft 212 to the driver via the handwheel 110.

The stub shaft 226 and the torsion bar 228 may all be located in or housed within a feedback actuator casting 229. In some cases, the motor and any components providing direct or indirect coupling between the motor and the stub shaft 226 may also be housed in the feedback actuator casting 229. However, a proximal end of the torsion bar 228 (relative to the column shaft) and a proximal end of the stub shaft 226 (also relative to the column shaft) may each protrude slightly out of, or at least be accessible (prior to assembly with the column 210), via an opening formed in the feedback actuator casting 229. The opening formed in the feedback actuator casting 229 may be adjacent to an opening of the column 210 at the forward end of the lower column casting 216 (e.g., where the column shaft terminates).

In this example, the upper and lower steering shafts 212 and 218 may act as a single column shaft although they are physically separate, but joined components. The column shaft may be supported proximate to each opposing end thereof by a respective bearing assembly. Thus, rotation of the column shaft within the column 210 may be fully supported at both ends. In an example embodiment, a first column shaft bearing 240 (or rear column bearing) may be disposed at an end of the upper jacket 214 (e.g., a distal end of the upper jacket 214 relative to the lower column casting 216). A second column shaft bearing 241 (or front column bearing) may be disposed at or proximate to an end of the lower steering shaft 218, which may also be proximate to an end of the lower column casting 216 (e.g., a proximal end relative to the feedback actuator 220).

Although the second column shaft bearing 241 could be press fit into the lower column casting 216, in the example of FIG. 3, the second column shaft bearing 241 is instead retained by a bearing retention plate 219. The bearing retention plate 219 may be press fit into the opening formed in the end of the lower column casting 216, and the second column shaft bearing 241 may be press fit into the bearing retention plate 219. The bearing retention plate 219 may have an interface portion that mates with the lower column casting 216. From the interface portion, the bearing retention plate 219 may extend inwardly from the end of the column 210 toward the second column shaft bearing 241. The inwardly extending portion of the bearing retention plate 219 may be substantially cylindrical in shape and may define a coupling chamber 221 formed between the second column shaft bearing 241 and the open portion of the column 210 that interfaces with the feedback actuator 220.

Meanwhile, the feedback actuator 220 may also include two sets of bearings to support the stub shaft 226 at both ends thereof. In this regard, a first feedback actuator bearing 242 (or forward actuator bearing) may be provided proximate to a distal end of the stub shaft 226 (relative to the column shaft). The other end of the stub shaft 226 (i.e., the proximal end relative to the column shaft) may be supported (directly or indirectly) by a second feedback actuator bearing 243. Accordingly, the rear column bearing, front column bearing, the rear actuator bearing and the forward actuator bearing may combine to support the column shaft and the stub shaft 226, when the column shaft and the stub shaft 226 are joined together as described herein.

For indirect support, in some cases, the second feedback actuator bearing 243 may actually be in direct contact with a sleeve element 244 (e.g., after coupling of the torsion bar 228 to the lower steering shaft 218 via the sleeve element 244). The sleeve element 244 may be a torsion limiting sleeve, that interfaces with the stub shaft 226 and torsion bar 228 in such a way as to prevent the torsion bar 228 from exceeding any torque ratings associated therewith. Thus, the sleeve element 244 may form a torque limiting interface at its coupling interface with the stub shaft 226. In this regard, for example, the sleeve element 244 may have a fixed connection (e.g., via a press fitting) to the torsion bar 228 at a proximal end of the torsion bar 228. Meanwhile, the sleeve element 244 may have a space between portions of the sleeve element 244 and the corresponding portions of the stub shaft 226. The space may be eliminated and direct contact and torque transfer between the stub shaft 226 and the sleeve element 244 if the torsion bar 228 reaches a certain point of deformation during torque application. Torque may thereafter be transferred to the stub shaft 226 to protect the torsion bar 228. In some cases, the sleeve element 244 may itself be considered to be a stub shaft, and may be considered an upper stub shaft (implying that the stub shaft 226 would then be considered a lower stub shaft).

In an example embodiment, the torsion bar 228 may be press fit into the stub shaft 226. The stub shaft 226 may be press fit into the first feedback actuator bearing 242, and the first feedback actuator bearing 242 may be press fit into the feedback actuator casting 229. The second column shaft bearing 241 may also be press fit into the lower column casting 216. However, the torsion bar 228 may be operably coupled to the lower steering shaft 218 via an adapter 250 that interfaces with the sleeve element 244.

The sleeve element 244 may be a cast metallic component in some embodiments. Meanwhile, the adapter 250 may be made of a compressible material (e.g., a molded plastic, polymeric, or composite material such as hydrogenated nitrile butadiene rubber (HNBR) having a Durometer 30-95 Shore A). Thus, the adapter 250 may be replaceable at routine maintenance intervals, or whenever maintenance is required. The adapter 250 may therefore be a consumable piece of equipment that is replaced periodically. The sleeve element 244 may have a diameter that is substantially similar to the diameter of the stub shaft 226, but may terminate (proximate to the column shaft) with an engagement interface 252. In this example, as shown in FIGS. 3D and 3E, the engagement interface 252 comprises a cylindrical projection 254 (coaxial with the torsion bar 228) having fins 256 extending radially outwardly from the periphery of the cylindrical projection 254. However, other shapes and structures could alternatively be employed. The cylindrical projection 254 and fins 256 may be received by correspondingly shaped receiving structures formed in the adapter 250.

Meanwhile, the adapter 250 may also include a column engager 262 which may be defined by a cylindrical projection 264 (coaxial with the torsion bar 228) having fins 266 extending radially outwardly from the periphery of the cylindrical projection 264. As with the engagement interface 252, the column engager 262 may also take different forms and have different shapes than the example shown.

Referring now to FIG. 3C, the proximal end of the lower steering shaft 218 may include a receiving orifice 270. The receiving orifice 270 has capture slots having a shape configured to receive the cylindrical projection 264 and fins 266 of the column engager 262. FIG. 3C also shows the bearing retention plate 219 in greater detail. As noted above, the second column shaft bearing 241 may be press fit into the bearing retention plate 219. Meanwhile, the second feedback actuator bearing 243 may be press fit into the feedback actuator casting 229. The sleeve element 244 may extend longitudinally from the second column shaft bearing 241 (where the sleeve element 244 interfaces with the column shaft via the adapter 250) to the second feedback actuator bearing 243 (where the sleeve element 244 interfaces with the stub shaft 226. Meanwhile, the torsion bar 228 may terminate at a position spaced apart from (and in between) each of the second column shaft bearing 241 and the second feedback actuator bearing 243. Because the torsion bar 228 is press fit into the sleeve element 244, and the adapter 250 is also press fit between the sleeve element 244 and the column shaft, there may be no need for the access port 230 and the cover 232 noted above in reference to FIG. 2.

The example of FIG. 3 shows a specific shape and structure for the adapter 250, and the structures between which the adapter 250 provides operable coupling. However, these shapes could be different in other examples. For example, FIG. 4, which is defined by FIGS. 4A, 4B, 4C and 4D, shows an alternative adapter structure. In this regard, the example of FIG. 4 is similar to that of FIG. 3 except that the interface of the torsion bar 228 and stub shaft 226 with the column shaft is slightly different.

Figure 4A:
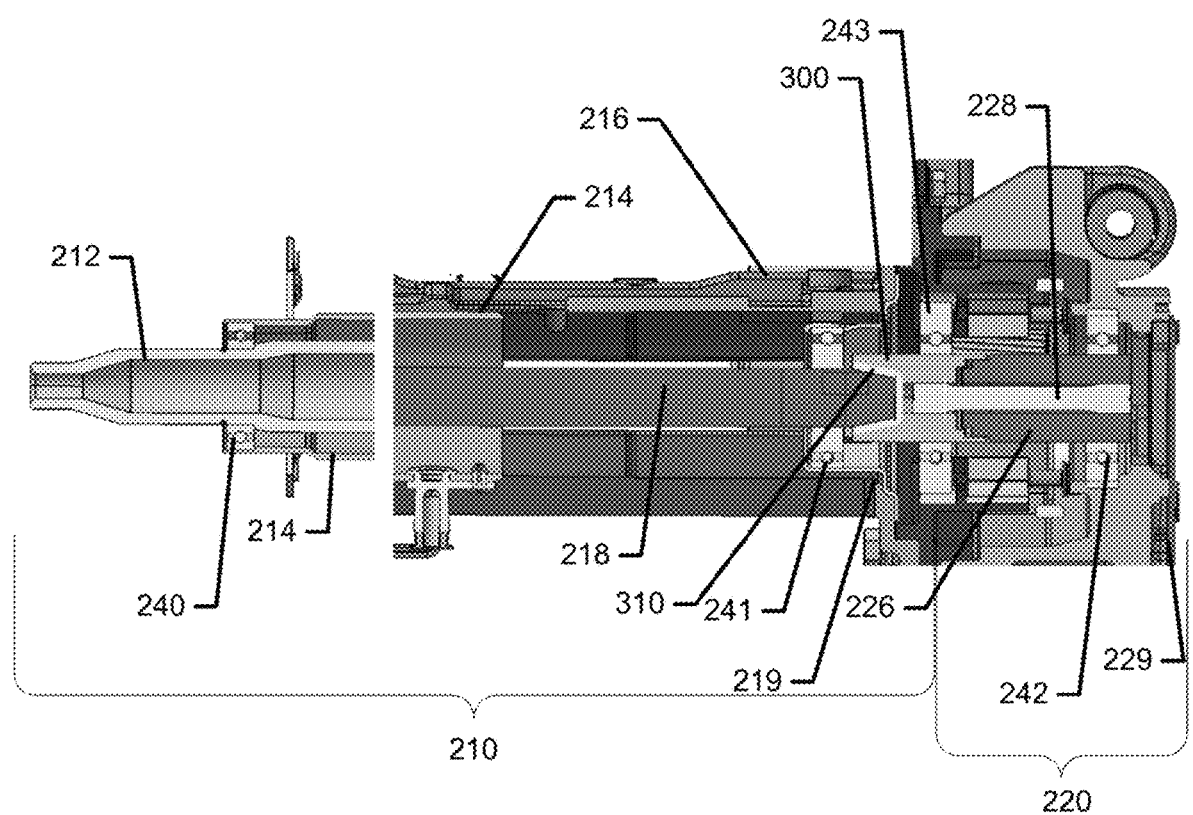
Figure 4B:
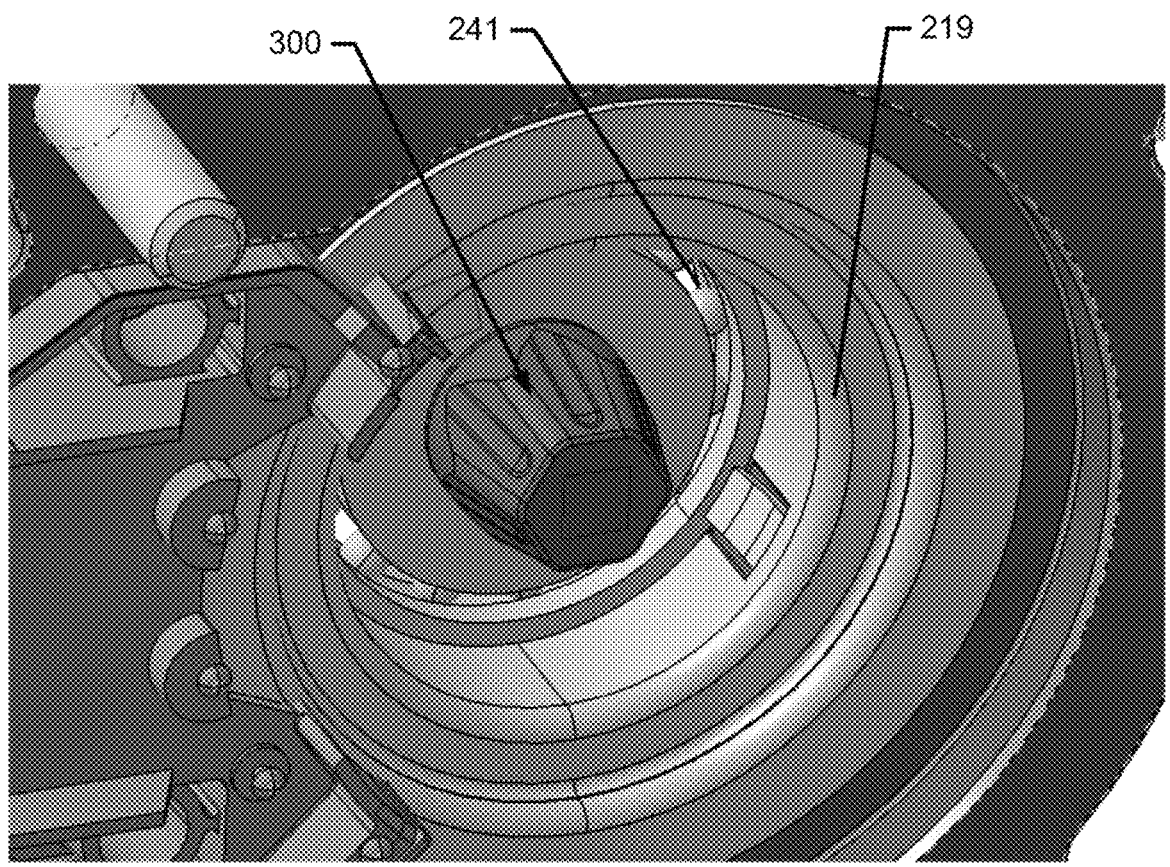
Figure 4D:
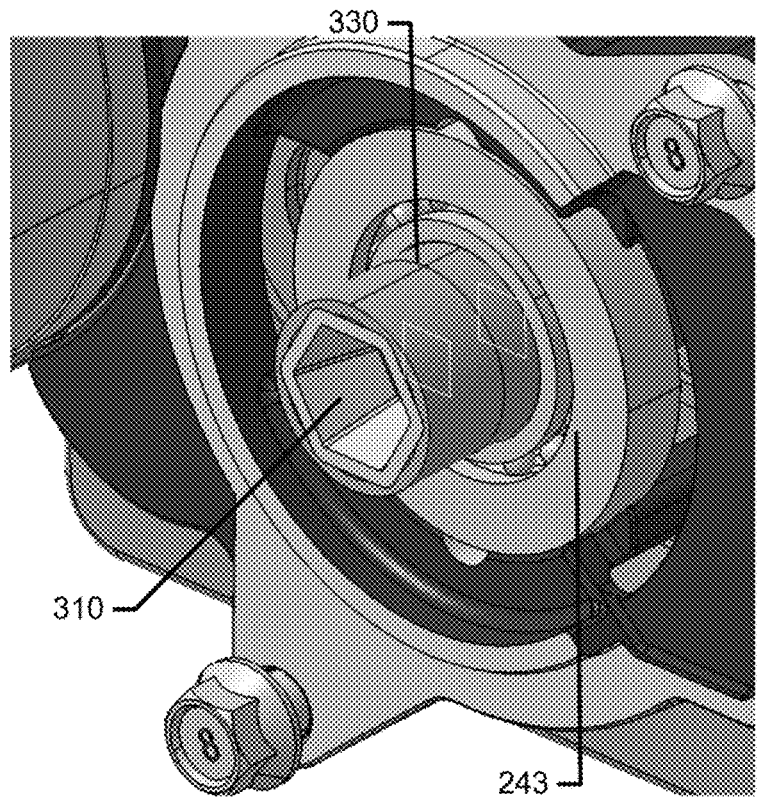
Figure 4C:
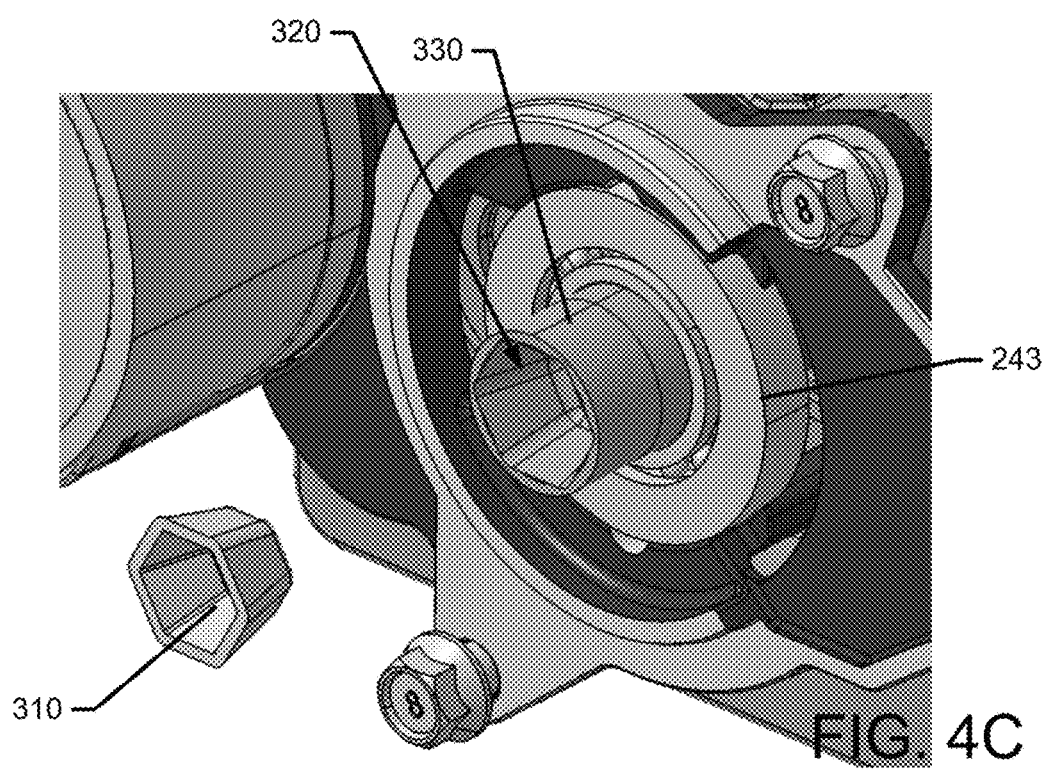

FIG. 4A is a cross section view through a longitudinal center of the handwheel actuator 200 of FIG. 3A. FIG. 4B is a perspective view of a proximal end of the column 210 separated from the feedback actuator 220. Meanwhile, FIGS. 4C and 4D illustrate perspective views of the portion of the feedback actuator 220 that interfaces with the proximal end of the column 210. In this regard, FIG. 4C is a partially exploded view, and FIG. 4D shows components assembled. Referring to FIG. 4, a proximal end of the column shaft (relative to the feedback actuator 220) may have a shaped protrusion 300 that is configured to interface with adapter 310. The shaped protrusion 300 may include six protruding planar faces that taper toward each other (but do not join) while extending toward the torsion bar 228. Thus, the shaped protrusion 300 may be a tapered hexagonal protrusion. In some cases, the planar faces may also have ribs or other features located thereon. However, such ribs are not required, and the shape of the shaped protrusion generally could also be modified in other examples.

The shaped protrusion 300 may be inserted into adapter 310 and press fit into contact with the adapter 310. Meanwhile, the adapter 310 be shaped to fit inside a shaped receiver 320 formed at the proximal end of the sleeve (or sleeve element 330). The shaped receiver 320 may have six planar faces that are recessed (substantially matching the degree of taper of the protruding planar faces of the shaped protrusion 300). The sleeve element 330 may be similar in shape and function to the sleeve element 244 of FIG. 3, except that the shaped receiver 320 may replace the engagement interface 252. Thus, for example, the interface between the sleeve element 330 and the stub shaft 226 may be the same as that described above in reference to FIG. 3. The interface between the torsion bar 228 and the sleeve element 330 may also be similar. In this regard, the torsion bar 228 may be press fit into contact with the sleeve element 330. However, the opposite end of the sleeve element 330 (i.e., the end that interfaces with the column shaft) may be different in the example of FIG. 4 in that the sleeve element 330 receives the adapter 310 therein, instead of projecting into the adapter 310 (as the adapter 250 has the sleeve element 244 project therein). As such, whereas the example of FIG. 3 defines a male/female interface between the sleeve element 244 and the column shaft with adapter 250 disposed therebetween, where the male portion of the interface is at the sleeve element 244 and the female portion of the interface is at the column shaft, the example of FIG. 4 reverses this paradigm. In this regard, the male portion of the interface in FIG. 4 is located at the column shaft, and the female portion of the interface is located at the sleeve element 330. The adapter 300 may be made of similar material to adapter 250, and fits between the male and female portions of the sleeve element 330 and the column shaft. Specific shapes and features that facilitate engagement and torque transfer may vary.

The adapter 310 also includes a six sided, tapered structure that matches the shape of the shaped receiver 320 on one side and the shaped protrusion 300 on the other side. The adapter 310 may also be made of a compressible material (e.g., HNBR) and may be replaced periodically, as described above. As with the example of FIG. 3, the adapter 310 provides for the interface between the column shaft and the torsion bar 228 and stub shaft 226 to occur via adaptive components (e.g., the adapters 250 and 310 and sleeve elements 244 and 330) that are provided between the second column shaft bearing 241 and the second feedback actuator bearing 243. Similarly, since all fittings are press fit or interference fittings, there is no need for the access port 230 of FIG. 2.

Still other structures can be used to form similar interfaces. In this regard, FIG. 5, which is defined by FIGS. 5A, 5B, 5C, 5D and 5E shows another example that does not employ a compressible material as an adapter. FIG. 5A is a cross section view through a longitudinal center of the handwheel actuator 200 of FIG. 3A. FIG. 5B is perspective view of an area of the cross section view of FIG. 5A that is zoomed in on a sleeve element 400 that replaces the sleeve elements 244 and 330 of FIGS. 3 and 4. FIG. 5C is a partial cross section, side view of the sleeve element 400. FIG. 5D is a perspective view of a proximal end of the column 210 separated from the feedback actuator 220. Meanwhile, 5E illustrates a perspective view of the portion of the feedback actuator 220 that interfaces with the proximal end of the column 210.

As with the examples of FIGS. 3 and 4, the example of FIG. 5 provides the interface between the column shaft and the torsion bar 228 and stub shaft 226 to occur via adaptive components that are provided between the second column shaft bearing 241 and the second feedback actuator bearing 243. However, the sleeve element 400 has a substantially different shape and structure on the side thereof that interfaces with the column shaft. In this regard, although the interface of the sleeve element 400 with the stub shaft 226 and the torsion bar 228 may be similar to that described above in reference to FIGS. 3 and 4, the interface between the sleeve element 400 and the column shaft is different. The torsion bar 228 may be press fit into one end of the sleeve element 400.

The lower steering shaft 218 may taper and terminate at a slotted shaft extension 410. The shaft extension 410 may be a separate component (e.g., welded onto or interference fit with the lower steering shaft 218), or may be a unitary structure formed as part of the lower steering shaft 218. The shaft extension 410 of this example has a "double D" shaped interior profile defining a receiving space 412 therein. The shaft extension 410 may have a flat top face 414 and bottom face 416 that are substantially parallel to each other, and curved sides connecting the flat top and bottom faces 414 and 416. A slot 418 may be formed longitudinally in one of the curved sides of the shaft extension 410. The slot 418 may allow the top and bottom faces 414 and 416 to be compressed toward each other to some degree during fastening of the shaft extension 410 to the sleeve element 400. In this regard, a threaded fastener 420 may be configured to pass through a hole formed in each of the top and bottom faces 414 and 416 to operably couple the shaft extension 410 to the sleeve element 400.

The sleeve element 400 may have a projection 430 that extends away from the torsion bar 228. The projection 430 may have an external profile that matches and fits inside the double D interior profile of the shaft extension 410. In this regard, the projection 430 may be shaped to fit securely within the receiving space 412. Thus, the projection 430 may also have top and bottom faces that are flat, and that lie adjacent to the top face 414 and bottom face 416, respectively, of the shaft extension 410. A coupling orifice 432 may pass through the top and bottom faces of the projection 430 and may receive the threaded fastener 420. In some cases, the top face 414 and/or bottom face 416 of the shaft extension 410 may have a threaded nut 434 welded thereon to form a threaded engagement with the threaded fastener 420 to enable the sleeve element 400 to be securely mated with the shaft extension 410.

The double D profile of the shaft extension 410 may necessitate the provision of an adaptive coupler 480 between the internal periphery of the second column shaft bearing 241 and the external periphery of the shaft extension 410. The adaptive coupler 480 may have a cylindrical body with the opening formed along its longitudinal center having a shape configured to fit the double D profile of the shaft extension 410.

In this example, a male/female coupling is also employed with the sleeve element 400 having the male member, and the column shaft having the female member, and both such members are again disposed between the second column shaft bearing 241 and the second feedback actuator bearing 243. Since access to the threaded fastener 420 must be provided, the bearing retention plate 219 may include an access opening 440 via which a socket tool or other device may engage the threaded fastener 420. The access opening 440 may align with the access port 230 shown in FIG. 2. Thus, the threaded fastener 420 may be accessible and capable of being fastened or unfastened via the access port 230 and the access opening 440.

The example of FIG. 6, which is defined by FIGS. 6A, 6B and 6C, form an arrangement similar to that of the example of FIG. 3 but without the second feedback actuator bearing 243. As such the connection of the stub shaft 226 and torsion bar 228' with the column shaft supports the stub shaft 226 via the second column shaft bearing 241. Otherwise, the example of FIG. 6 shows includes a multi-lobe engagement structure 500 that is an interference fit into respective capture slots 510 formed in the lower steering shaft 218. The lobes of the multi-lobe engagement structure 500 may be equidistantly spaced about a periphery of the torsion bar 228' as shown in FIGS. 6B and 6C, which illustrate perspective views of the multi-lobe engagement structure 500. Meanwhile, FIG. 6A illustrates a cross section view similar to that of FIGS. 3B and 4A. The torsion bar 228' may be received into the lower steering shaft 218 (and more particularly into the capture slots 510) thereof to absorb lash between the column 210 and the feedback actuator 220. The multi-lobe engagement structure 500 and capture slots 510 of the example of FIG. 6 may be employed either with the bearing retention plate 219 of the examples of FIGS. 3-5 (as shown in FIG. 6) or without the bearing retention plate 219 and therefore retaining the second column shaft bearing 241 by press fit with the feedback actuator casting 229.

Example embodiments may therefore also include a handwheel actuator for a steer by wire system. The handwheel actuator may include a feedback actuator and a column for operably coupling a handwheel to the handwheel actuator. The column may include a column shaft extending from a first end of the column to a second end of the column. The feedback actuator may be operably coupled to the second end of the column and may provide tactile feedback to an operator responsive to movement of the handwheel. The feedback actuator may include a torsion bar coaxial with the column shaft. The column shaft may be supported relative to a housing of the column by a first column shaft bearing disposed proximate to the first end of the column and a second column shaft bearing disposed proximate to the second end of the column. The torsion bar may be operably coupled to a sleeve element that is operably coupled to the column shaft proximate to the second column shaft bearing to facilitate torque transfer between the column shaft and the torsion bar.

The handwheel actuator of some embodiments may include additional features, modifications, augmentations and/or the like to achieve further objectives or enhance performance of the device. The additional features, modifications, augmentations and/or the like may be added in any combination with each other. Below is a list of various additional features, modifications, and augmentations that can each be added individually or in any combination with each other. For example, the second column shaft bearing may be retained in a bearing retention plate that is operably coupled to the housing. The bearing retention plate may extend inwardly from the second end of the column to define a coupling chamber formed between the second column shaft bearing and the second end of the column, and the sleeve element may be disposed in the coupling chamber. In an example embodiment, an access opening may be formed in a periphery of the bearing retention plate to provide access to a threaded fastener that operably couples the sleeve element to the column shaft. In some examples, the feedback actuator may include a first feedback actuator bearing supporting a first end of the torsion bar and a second feedback actuator bearing supporting a second end of the torsion bar, and the coupling chamber may extend between the first and second feedback actuator bearings. In an example embodiment, a stub shaft may extend around a periphery of the torsion bar from a distal end of the torsion bar relative to the column shaft to a portion of the torsion bar that is spaced apart from a proximal end of the torsion bar. The sleeve element may be operably coupled to the column shaft proximate to the second column shaft bearing and operably coupled to the stub shaft proximate to the second feedback actuator bearing. In some examples, the sleeve element may extend from the second column shaft bearing to the second feedback actuator bearing. In an example embodiment, a compressible adapter may be disposed between the sleeve element and the column shaft to operably couple the sleeve element to the column shaft. In some examples, the compressible adapter may be press fit into contact with each of the sleeve element and the column shaft. In an example embodiment, the compressible adapter may be shaped to receive a male protrusion formed at the sleeve element, and shaped to be inserted into a female receiving opening formed at the column shaft. In some examples, the male protrusion may include a cylindrical protrusion with radially extending ribs. The female receiving opening may include a circular opening with radially extending capture slots. The compressible adapter may be formed to receive the cylindrical protrusion and the radially extending ribs on a first side thereof, and to insert into the circular opening and the radially extending capture slots on a second side thereof. In an example embodiment, the compressible adapter may be shaped to receive a male protrusion formed at the column shaft, and shaped to be inserted into a female receiving opening formed at the sleeve element. In some examples, the male protrusion may include a plurality of protruding planar faces that taper along a length of the protruding planar faces. The female receiving opening may include a corresponding plurality of recessed planar faces that taper along a length of the recessed planar faces. The compressible adapter may be formed to receive the male protrusion on a first side thereof, and to insert into the female receiving opening on a second side thereof. In an example embodiment, the compressible adapter comprises hydrogenated nitrile butadiene rubber (HNBR) having a Durometer 30-95 Shore A. In some examples, the feedback actuator may include a stub shaft coaxial with the torsion bar, and the stub shaft may include a torque limiting interface formed with the sleeve element to prevent over-application of torque to the torsion bar. In an example embodiment, the column shaft may include a shaft extension that operably couples the column shaft to a projection of the sleeve element via a threaded fastener. In some examples, the shaft extension may have a flat top face and a flat bottom face. The top and bottom faces may be connected to each other by curved surfaces at lateral ends thereof to define a receiving space, and the projection may have a flat top and bottom and curved sides shaped to fit into the receiving space. In an example embodiment, the threaded fastener may extend through the shaft extension via a threaded receiver disposed at one or both of the top face and the bottom face of the shaft extension. In some examples, the threaded fastener may include a nut welded to the top face or the bottom face of the shaft extension. In an example embodiment, an adaptive coupler may be disposed between an internal periphery of the second column shaft bearing and an external periphery of the shaft extension. In some examples, the adaptive coupler may have a cylindrical body with an opening formed along a longitudinal center of the cylindrical body. The opening may have an internal periphery matching an external profile of the shaft extension.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A handwheel actuator for a steer by wire system, the handwheel actuator comprising:
   a column for operably coupling a handwheel to the handwheel actuator, the column comprising a column shaft extending from a first end of the column to a second end of the column; and
   a feedback actuator operably coupled to the second end of the column, the feedback actuator providing tactile feedback to an operator responsive to movement of the handwheel,
   wherein the feedback actuator comprises a torsion bar coaxial with the column shaft,
   wherein the column shaft is supported relative to a housing of the column by a first column shaft bearing disposed proximate to the first end of the column and a second column shaft bearing disposed proximate to the second end of the column,
   wherein the torsion bar is operably coupled to a sleeve element that is operably coupled to the column shaft proximate to the second column shaft bearing to facilitate torque transfer between the column shaft and the torsion bar,
   wherein the second column shaft bearing is retained in a bearing retention plate that is operably coupled to the housing, wherein the bearing retention plate extends inwardly from the second end of the column to define a coupling chamber formed between the second column shaft bearing and the second end of the column, and wherein the sleeve element is disposed in the coupling chamber.

2. The handwheel actuator of claim 1, wherein an access opening is formed in a periphery of the bearing retention plate to provide access to a threaded fastener that operably couples the sleeve element to the column shaft.

3. The handwheel actuator of claim 1, wherein the feedback actuator comprises a first feedback actuator bearing supporting a first end of the torsion bar and a second feedback actuator bearing supporting a second end of the torsion bar, and wherein the coupling chamber extends between the first and second feedback actuator bearings.

4. The handwheel actuator of claim 3, wherein a stub shaft extends around a periphery of the torsion bar from a distal end of the torsion bar relative to the column shaft to a portion of the torsion bar that is spaced apart from a proximal end of the torsion bar, wherein the sleeve element is operably coupled to the column shaft proximate to the second column shaft bearing and operably coupled to the stub shaft proximate to the second feedback actuator bearing.

5. The handwheel actuator of claim 3, wherein the sleeve element extends from the second column shaft bearing to the second feedback actuator bearing.

6. The handwheel actuator of claim 1, wherein a compressible adapter is disposed between the sleeve element and the column shaft to operably couple the sleeve element to the column shaft.

7. The handwheel actuator of claim 6, wherein the compressible adapter is press fit into contact with each of the sleeve element and the column shaft.

8. The handwheel actuator of claim 6, wherein the compressible adapter is shaped to receive a male protrusion formed at the sleeve element, and shaped to be inserted into a female receiving opening formed at the column shaft.

9. The handwheel actuator of claim 8, wherein the male protrusion comprises a cylindrical protrusion with radially extending ribs, wherein the female receiving opening comprises a circular opening with radially extending capture slots, and wherein the compressible adapter is formed to receive the cylindrical protrusion and the radially extending ribs on a first side thereof, and to insert into the circular opening and the radially extending capture slots on a second side thereof.

10. A handwheel actuator for a steer by wire system, the handwheel actuator comprising:

a column for operably coupling a handwheel to the handwheel actuator, the column comprising a column shaft extending from a first end of the column to a second end of the column; and a feedback actuator operably coupled to the second end of the column, the feedback actuator providing tactile feedback to an operator responsive to movement of the handwheel, wherein the feedback actuator comprises a torsion bar coaxial with the column shaft, wherein the column shaft is supported relative to a housing of the column by a first column shaft bearing disposed proximate to the first end of the column and a second column shaft bearing disposed proximate to the second end of the column, wherein the torsion bar is operably coupled to a sleeve element that is operably coupled to the column shaft proximate to the second column shaft bearing to facilitate torque transfer between the column shaft and the torsion bar, wherein a compressible adapter is disposed between the sleeve element and the column shaft to operably couple the sleeve element to the column shaft, wherein the compressible adapter is shaped to receive a male protrusion formed at the column shaft, and shaped to be inserted into a female receiving opening formed at the sleeve element.

11. The handwheel actuator of claim 10, wherein the male protrusion comprises a plurality of protruding planar faces that taper along a length of the protruding planar faces, wherein the female receiving opening comprises a corresponding plurality of recessed planar faces that taper along a length of the recessed planar faces, and wherein the compressible adapter is formed to receive the male protrusion on a first side thereof, and to insert into the female receiving opening on a second side thereof.

12. The handwheel actuator of claim 6, wherein the compressible adapter comprises hydrogenated nitrile butadiene rubber (HNBR) having a Durometer 30-95 Shore A.

13. The handwheel actuator of claim 1, wherein the feedback actuator comprises a stub shaft coaxial with the torsion bar, and wherein the stub shaft comprises a torque limiting interface formed with the sleeve element to prevent overapplication of torque to the torsion bar.

14. A handwheel actuator for a steer by wire system, the handwheel actuator comprising:

a column for operably coupling a handwheel to the handwheel actuator, the column comprising a column shaft extending from a first end of the column to a second end of the column; and a feedback actuator operably coupled to the second end of the column, the feedback actuator providing tactile feedback to an operator responsive to movement of the handwheel, wherein the feedback actuator comprises a torsion bar coaxial with the column shaft, wherein the column shaft is supported relative to a housing of the column by a first column shaft bearing disposed proximate to the first end of the column and a second column shaft bearing disposed proximate to the second end of the column, wherein the torsion bar is operably coupled to a sleeve element that is operably coupled to the column shaft proximate to the second column shaft bearing to facilitate torque transfer between the column shaft and the torsion bar, wherein the column shaft includes a shaft extension that operably couples the column shaft to a projection of the sleeve element via a threaded fastener.

15. The handwheel actuator of claim 14, wherein the shaft extension has a flat top face and a flat bottom face, the top and bottom faces being connected to each other by curved surfaces at lateral ends thereof to define a receiving space, wherein the projection has a flat top and bottom and curved sides shaped to fit into the receiving space.

16. The handwheel actuator of claim 15, wherein the threaded fastener extends through the shaft extension via a threaded receiver disposed at one or both of the top face and the bottom face of the shaft extension.

17. The handwheel actuator of claim 16, wherein the threaded fastener comprises a nut welded to the top face or the bottom face of the shaft extension.

18. The handwheel actuator of claim 15, wherein an adaptive coupler is disposed between an internal periphery of the second column shaft bearing and an external periphery of the shaft extension.

19. The handwheel actuator of claim 18, wherein the adaptive coupler has a cylindrical body with an opening formed along a longitudinal center of the cylindrical body, the opening having an internal periphery matching an external profile of the shaft extension.

* * * * *